United States Patent
Shimizu et al.

(10) Patent No.: US 8,311,356 B2
(45) Date of Patent: Nov. 13, 2012

(54) IMAGE PROCESSING APPARATUS AND IMAGE PROCESSING METHOD

(75) Inventors: Masayoshi Shimizu, Kawasaki (JP); Yuushi Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 12/801,665

(22) Filed: Jun. 18, 2010

(65) Prior Publication Data

US 2010/0260432 A1    Oct. 14, 2010

Related U.S. Application Data

(63) Continuation of application No. PCT/JP2007/074841, filed on Dec. 25, 2007.

(51) Int. Cl.
*G06K 9/40* (2006.01)

(52) U.S. Cl. ........................................ 382/254

(58) Field of Classification Search ........... 382/254–275
See application file for complete search history.

(56) References Cited

U.S. PATENT DOCUMENTS

| | | | | |
|---|---|---|---|---|
| 5,048,109 | A | * | 9/1991 | Bloomberg et al. ........... 382/164 |
| 5,212,740 | A | * | 5/1993 | Paek et al. ...................... 382/266 |
| 5,799,112 | A | * | 8/1998 | de Queiroz et al. ............ 382/254 |
| 6,023,535 | A | * | 2/2000 | Aoki ................................ 382/299 |
| 2003/0016306 | A1 | | 1/2003 | Ogata et al. |
| 2004/0071360 | A1 | * | 4/2004 | Maurer .......................... 382/254 |
| 2004/0175054 | A1 | * | 9/2004 | Ogata et al. .................... 382/274 |
| 2009/0046166 | A1 | | 2/2009 | Kuniba |
| 2009/0122081 | A1 | | 5/2009 | Tsubaki et al. |

FOREIGN PATENT DOCUMENTS

| | | |
|---|---|---|
| JP | 2000-105815 | 4/2000 |
| JP | 2003-8898 | 1/2003 |
| JP | 2004-172726 | 6/2004 |
| JP | 2005-328277 | 11/2005 |
| JP | 09-270005 | 10/2007 |
| WO | 2007/097125 | 8/2007 |
| WO | 2007/129367 | 11/2007 |

OTHER PUBLICATIONS

International Search Report corresponding to PCT/JP2007/074841 mailed Jan. 29, 2008.

* cited by examiner

*Primary Examiner* — Alex Liew
(74) *Attorney, Agent, or Firm* — Fujitsu Patent Center

(57) ABSTRACT

An image processing apparatus includes a level-value-limit smoothed-image creating unit, a level-value combining unit, and a smoothed-image creating unit. The level-value-limit smoothed-image creating unit calculates, from the pixels in a received input image within a filter size of the low-pass filters each having different level value ranges, an average value of the pixels in the level value ranges, and creates level-value-limit smoothed images. The level-value combining unit creates a level-value combined image by selecting and combining one or more of the level-value-limit smoothed images. The smoothed-image creating unit determines, based on image information that is different from image information used by the level-value-limit smoothed-image creating unit, a combining ratio of the input image to the level-value combined image and creates a smoothed image by combining the input image and the level-value combined image using the determined combining ratio.

18 Claims, 17 Drawing Sheets

FIG.3

Y COMPONENTS

| 10 | 15 | 17 | 18 |  |  |  |  |  | 239 | 246 | 232 | 240 |
|----|----|----|----|--|--|--|--|--|-----|-----|-----|-----|
| 18 | 25 | 23 | 19 |  |  |  |  |  | 242 | 244 | 239 | 244 |
| 23 | 28 | 25 | 24 |  |  |  |  |  | 245 | 248 | 244 | 244 |
| 22 | 30 | 32 | 30 |  |  |  |  |  | 251 | 250 | 250 | 248 |
|    |    |    |    |  |  |  |  |  |     |     |     |     |
|    |    |    |    |  |  |  |  |  |     |     |     |     |
|    |    |    |    |  |  |  |  |  |     |     |     |     |
|    |    |    |    |  |  |  |  |  |     |     |     |     |
|    |    |    |    |  |  |  |  |  |     |     |     |     |
|    |    |    |    |  |  |  |  |  |     |     |     |     |

FIG.4

Cr COMPONENTS (ORIGINAL IMAGE)

| 140 | 149 | 145 | 146 |  |  |  |  |  | 139 | 145 | 146 | 140 |
|-----|-----|-----|-----|--|--|--|--|--|-----|-----|-----|-----|
| 146 | 153 | 139 | 148 |  |  |  |  |  | 142 | 151 | 147 | 142 |
| 153 | 148 | 153 | 152 |  |  |  |  |  | 153 | 156 | 144 | 144 |
| 155 | 150 | 160 | 158 |  |  |  |  |  | 151 | 160 | 158 | 146 |
|     |     |     |     |  |  |  |  |  |     |     |     |     |
|     |     |     |     |  |  |  |  |  |     |     |     |     |
|     |     |     |     |  |  |  |  |  |     |     |     |     |
|     |     |     |     |  |  |  |  |  |     |     |     |     |
|     |     |     |     |  |  |  |  |  |     |     |     |     |
|     |     |     |     |  |  |  |  |  |     |     |     |     |

FIG.5

Cr COMPONENTS
(SMOOTHED RESULT: LEVEL-VALUE-LIMIT COMBINING)

| 147 | 148 | 147 | 149 | | | | | | 147 | 146 | 144 | 142 |
|---|---|---|---|---|---|---|---|---|---|---|---|---|
| 151 | 151 | 152 | 153 | | | | | | 151 | 150 | 147 | 144 |
| 153 | 154 | 156 | 155 | | | | | | 154 | 151 | 148 | 145 |
| 155 | 156 | 159 | 158 | | | | | | 156 | 155 | 152 | 146 |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FIG.6

Cr COMPONENTS (COMBINED RESULT)
Out=(L*(255-Y)+In*Y)/255

| 147 | 148 | 147 | 148 | | | | | | 140 | 145 | 146 | 140 |
|---|---|---|---|---|---|---|---|---|---|---|---|---|
| 150 | 151 | 151 | 152 | | | | | | 142 | 151 | 147 | 142 |
| 153 | 153 | 155 | 155 | | | | | | 153 | 156 | 144 | 144 |
| 155 | 155 | 159 | 158 | | | | | | 151 | 160 | 158 | 146 |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FIG.7

Cr COMPONENTS (COMBINED RESULT)
if Y<255/2 Out=(L*(255-Y)+In*Y)/255 else Out=(In+L)/2

| 147 | 148 | 147 | 148 | | | | | | 143 | 146 | 145 | 141 |
|---|---|---|---|---|---|---|---|---|---|---|---|---|
| 150 | 151 | 151 | 152 | | | | | | 147 | 150 | 147 | 143 |
| 153 | 153 | 155 | 155 | | | | | | 153 | 154 | 146 | 145 |
| 155 | 155 | 159 | 158 | | | | | | 154 | 157 | 155 | 146 |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FIG.10

Y COMPONENTS

| 10 | 15 | 17 | 18 | | | | | | | 239 | 246 | 232 | 240 |
|---|---|---|---|---|---|---|---|---|---|---|---|---|---|
| 18 | 25 | 23 | 19 | | | | | | | 242 | 244 | 239 | 244 |
| 23 | 28 | 25 | 24 | | | | | | | 245 | 248 | 244 | 244 |
| 22 | 30 | 32 | 30 | | | | | | | 251 | 250 | 250 | 248 |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

FIG.11

Y COMPONENTS (CORRECTION RESULT)

| 50 | 62 | 66 | 68 | | | | | | | 247 | 250 | 243 | 247 |
|---|---|---|---|---|---|---|---|---|---|---|---|---|---|
| 68 | 80 | 77 | 70 | | | | | | | 248 | 249 | 247 | 249 |
| 77 | 84 | 80 | 78 | | | | | | | 250 | 251 | 249 | 249 |
| 75 | 87 | 90 | 87 | | | | | | | 253 | 252 | 252 | 251 |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

FIG.12

Y COMPONENTS
(SMOOTHED RESULT: LEVEL-VALUE-LIMIT COMBINING)

| 65 | 67 | 70 | 70 |  |  |  |  |  | 249 | 248 | 248 | 247 |
|----|----|----|----|--|--|--|--|--|-----|-----|-----|-----|
| 70 | 71 | 74 | 73 |  |  |  |  |  | 249 | 248 | 249 | 248 |
| 79 | 80 | 82 | 80 |  |  |  |  |  | 251 | 250 | 250 | 250 |
| 81 | 82 | 85 | 84 |  |  |  |  |  | 252 | 251 | 251 | 251 |
|    |    |    |    |  |  |  |  |  |     |     |     |     |
|    |    |    |    |  |  |  |  |  |     |     |     |     |
|    |    |    |    |  |  |  |  |  |     |     |     |     |
|    |    |    |    |  |  |  |  |  |     |     |     |     |
|    |    |    |    |  |  |  |  |  |     |     |     |     |
|    |    |    |    |  |  |  |  |  |     |     |     |     |

FIG.13

Y COMPONENTS (CORRECTION AMOUNT)

| 40 | 47 | 49 | 50 |  |  |  |  |  | 8 | 4 | 11 | 7 |
|----|----|----|----|--|--|--|--|--|---|---|----|---|
| 50 | 55 | 54 | 51 |  |  |  |  |  | 6 | 5 | 8  | 5 |
| 54 | 56 | 55 | 54 |  |  |  |  |  | 5 | 3 | 5  | 5 |
| 53 | 57 | 58 | 57 |  |  |  |  |  | 2 | 2 | 2  | 3 |
|    |    |    |    |  |  |  |  |  |   |   |    |   |
|    |    |    |    |  |  |  |  |  |   |   |    |   |
|    |    |    |    |  |  |  |  |  |   |   |    |   |
|    |    |    |    |  |  |  |  |  |   |   |    |   |
|    |    |    |    |  |  |  |  |  |   |   |    |   |
|    |    |    |    |  |  |  |  |  |   |   |    |   |

FIG.14

**Y COMPONENTS
(COMBINED RESULT)** Out =(In*(255-C)+L*C)/255

| 53 | 63 | 67 | 68 | | | | | | | 247 | 250 | 243 | 247 |
|---|---|---|---|---|---|---|---|---|---|---|---|---|---|
| 68 | 78 | 76 | 70 | | | | | | | 248 | 249 | 247 | 249 |
| 77 | 83 | 80 | 79 | | | | | | | 250 | 251 | 249 | 249 |
| 76 | 86 | 89 | 87 | | | | | | | 253 | 252 | 252 | 251 |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

IMAGE PROCESSING APPARATUS AND IMAGE PROCESSING METHOD

CROSS-REFERENCE TO RELATED APPLICATION

This application is a continuation of International Application No. PCT/JP2007/074841, filed on Dec. 25, 2007, the entire contents of which are incorporated herein by reference.

FIELD

The embodiments discussed herein are directed to an image processing apparatus that creates, from received input images, smoothed images in which the input images are blurred, and an image processing method and image processing program therefor.

BACKGROUND

In conventional digital image processing, when a blurred smoothed image is created by using low-pass filters, an average value of level values of pixels within the filter size is used as a signal level of the target pixel. However, when low-pass filters are used, because an average value of level values of pixels within the filter size is used as a level value of the target pixel, an edge portion where a difference between level values is large becomes blurred, which is a problem. Specifically, when the low-pass filters are used, as illustrated in FIG. 17, the gradient of the edge portion, in which the difference is large between brightness and darkness in the image to be processed (indicated by the solid line), becomes dull in a low-pass filter image (an LPF image is illustrated in the drawing and indicated by the dotted line) that is output from the low-pass filters; therefore, the edge portion cannot be preserved.

To solve such a problem, various technologies in which an edge portion in an image is accurately preserved and a portion other than the edge portion is blurred have been proposed. For example, Japanese Laid-open Patent Publication No. 2000-105815 discloses a technology related to a face image processing apparatus (image processing apparatus) using an epsilon filter.

Specifically, as illustrated in FIG. 18, the face image processing apparatus uses a pixel located at the coordinates (m, n) in the image as the target pixel and uses pixels neighboring the target pixel (in this case, eight pixels of the coordinates (m−1, n−1), the coordinates (m, n−1), the coordinates (m+1, n−1), the coordinates (m−1, n), the coordinates (m+1, n), the coordinates (m−1, n+1), the coordinates (m, n+1), and the coordinates (m+1, n+1)) as neighboring pixels. Subsequently, the face image processing apparatus calculates the difference between a level value of the target pixel (e.g., a grayscale value of a luminance signal) and a level value of the neighboring pixel and extracts neighboring pixels that have a calculated difference that is smaller than a predetermined threshold TH. Then, the face image processing apparatus outputs a value, which is obtained by adding the pixel value of the target pixel to a pixel value obtained by multiplying signal levels of the extracted neighboring pixels by a predetermined coefficient, as the pixel value of the target pixel.

In this way, with the technology described in Japanese Laid-open Patent Publication No. 2000-105815, a level range of a grayscale value is limited by processing only neighboring pixels that have the difference between the level value of the target pixel that is smaller than the threshold TH. Accordingly, as illustrated in FIG. 19, the gradient of the edge portion in an epsilon filter image (an epsilon filter image is illustrated in the drawing and indicated by the dotted line) that is output from an epsilon filter preserves, without becoming dull, the gradient of the edge portion in the image to be processed (indicated by the solid line); therefore, it is possible to accurately preserve an edge portion and to blur a portion other than the edge portion.

However, with the technology described above, there is a problem in that the noise removal level cannot be easily controlled, and, even when the noise removal level can be controlled, it is not possible to perform the process at high speed.

Specifically, noise in an image includes noise due to a change in brightness (luminance) and noise due to a change in color (hue). A change in color is noticeable by a human, and noise due to a change in color often tends to be present in a low luminance region. Accordingly, to remove noise due to a change in color while avoiding an unnatural appearance, the removal level of the noise due to a change in color needs to be changed in accordance with the luminance value of the input image. For example, with the technology described in Japanese Laid-open Patent Publication No. 2000-105815, when a smoothing process is performed, it is conceivable to use a method in which the noise removal level of an epsilon filter is made to be changed by calculating, for each input image, a luminance value and multiplying the filter coefficient according to the calculated luminance value by an epsilon filter. In such a case, however, the smoothing process needs to be performed, every time for each input image, by calculating the luminance value to obtain a filter coefficient and by multiplying the filter coefficient by the epsilon filter, causing the process to be extremely slow.

SUMMARY

According to an aspect of an embodiment of the invention, an image processing apparatus includes: a level-value-limit smoothed-image creating unit that uses, using low-pass filters to which different level value ranges are set respectively, pixels in a received input image as pixels to be processed, calculates, from the pixels in the input image that includes the pixels to be processed that are included within a filter size of the low-pass filters, an average value of the pixels included in the level value ranges, and creates a plurality of level-value-limit smoothed images that is limited by a plurality of level values; a level-value combining unit that selects one or more of the level-value-limit smoothed images created by the level-value-limit smoothed-image creating unit and creates a level-value combined image by combining the selected level-value-limit smoothed images; and a smoothed-image creating unit that determines, on the basis of image information that is different from image information related to an image constituting an input image that is used when a plurality of level-value-limit smoothed images is created by the level-value-limit smoothed-image creating unit, a combining ratio of the input image to the level-value combined image that is combined by the level-value combining unit and creates a smoothed image, in which the input image is blurred, by combining, using the determined combining ratio, the input image and the level-value combined image.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a schematic diagram illustrating Y components separated from an input image;

FIG. 4 is a schematic diagram illustrating Cr components separated from an input image;

FIG. 5 is a schematic diagram illustrating Cr components of an input image that is subjected to smoothing;

FIG. 6 is a schematic diagram illustrating a smoothed image created by combining original images using a combining ratio;

FIG. 7 is a schematic diagram illustrating a smoothed image created by combining original images using a nonlinear combining ratio in high luminance regions;

FIG. 10 is a schematic diagram illustrating Y components separated from an original image according to the second embodiment;

FIG. 11 is a schematic diagram illustrating Y components separated from an input image according to a second embodiment;

FIG. 12 is a schematic diagram illustrating Y components of an input image that is subjected to smoothing;

FIG. 13 is a schematic diagram illustrating a luminance correction amount;

FIG. 14 is a schematic diagram illustrating a smoothed image created by combining original images using a combining ratio according to the second embodiment;

DESCRIPTION OF EMBODIMENTS

Preferred embodiments of the present invention will be explained with reference to accompanying drawings. In the following description, the main term used in the embodiments, the outline and features of the image processing apparatus according to the embodiments, the configuration of the image processing apparatus, and the flow of processing thereof are described in the order they are listed in this sentence. Finally, various modifications of the embodiments will be described.

[a] First Embodiment

Explanation of Terms

First, the main terms used in the embodiment are described. The "image processing apparatus (corresponding to an "image processing apparatus" in the CLAIMS)" that is used in the embodiments is an apparatus that receives input images and image information and creates output images by smoothing the received input images. The input images can be moving images or still images, and color images or monochrome images.

Figure 20:
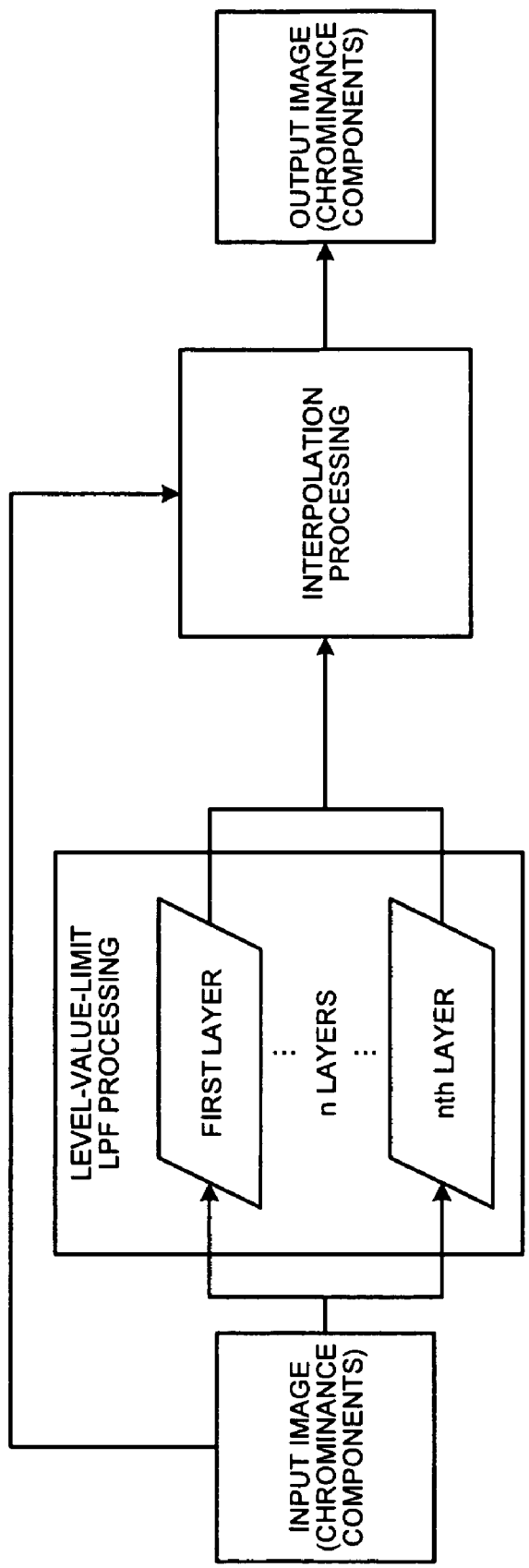
FIG. 20 is a schematic diagram illustrating an example of an image processing apparatus in which discrete a low-pass filter is used.

Furthermore, as a technology for accurately preserving an edge portion of an image and blurring a portion other than the edge portion, as in a similar case of using an epsilon filter, a method using a discrete low-pass filter is conceivable. Specifically, as illustrated in FIG. 20, by using a plurality of level-limit low-pass filters (discrete low-pass filters), to which different level value ranges are set, that creates a smoothed image using only pixels within the level value ranges, the edge portion is accurately preserved and a portion other than the edge portion is blurred by creating, in advance, a plurality of smoothed images, selecting a plurality of smoothing results, and performing interpolation.

Specifically, the "image processing apparatus" includes (discrete) low-pass filters (LPFs) having both a first layer to an $n^{th}$ layer and different level values. In a one-dimensional filter process performed on an input image in the lateral direction, each of the LPFs, first, determines whether the level values of pixels in the input image within the filter size are within the level value range to which each individual LPF is set. Then, each of the LPFs calculates an average value by accumulating the level values of the pixels, in the input image within the filter size, that are determined to be within the level value range to which each individual LPF is set and sets the calculated average value to a level value of the target pixel. Then, for the image in which all pixels are subjected to the one-dimensional filter process in the lateral direction, in a similar manner, each of the LPFs performs the one-dimensional filter process in the vertical direction and creates level-value-limit smoothed images by obtaining level values of the pixels using all of the pixels in the input image as target pixels. Thereafter, the "image processing apparatus" creates a smoothed image by combining the created level-value-limit smoothed images. The term "average value", as used here, includes a weighting average value. For example, regarding a position, if the center of the filter region is in the level direction that has the highest weighting, the level range of the center is assigned to the highest weighting.

Figure 21:
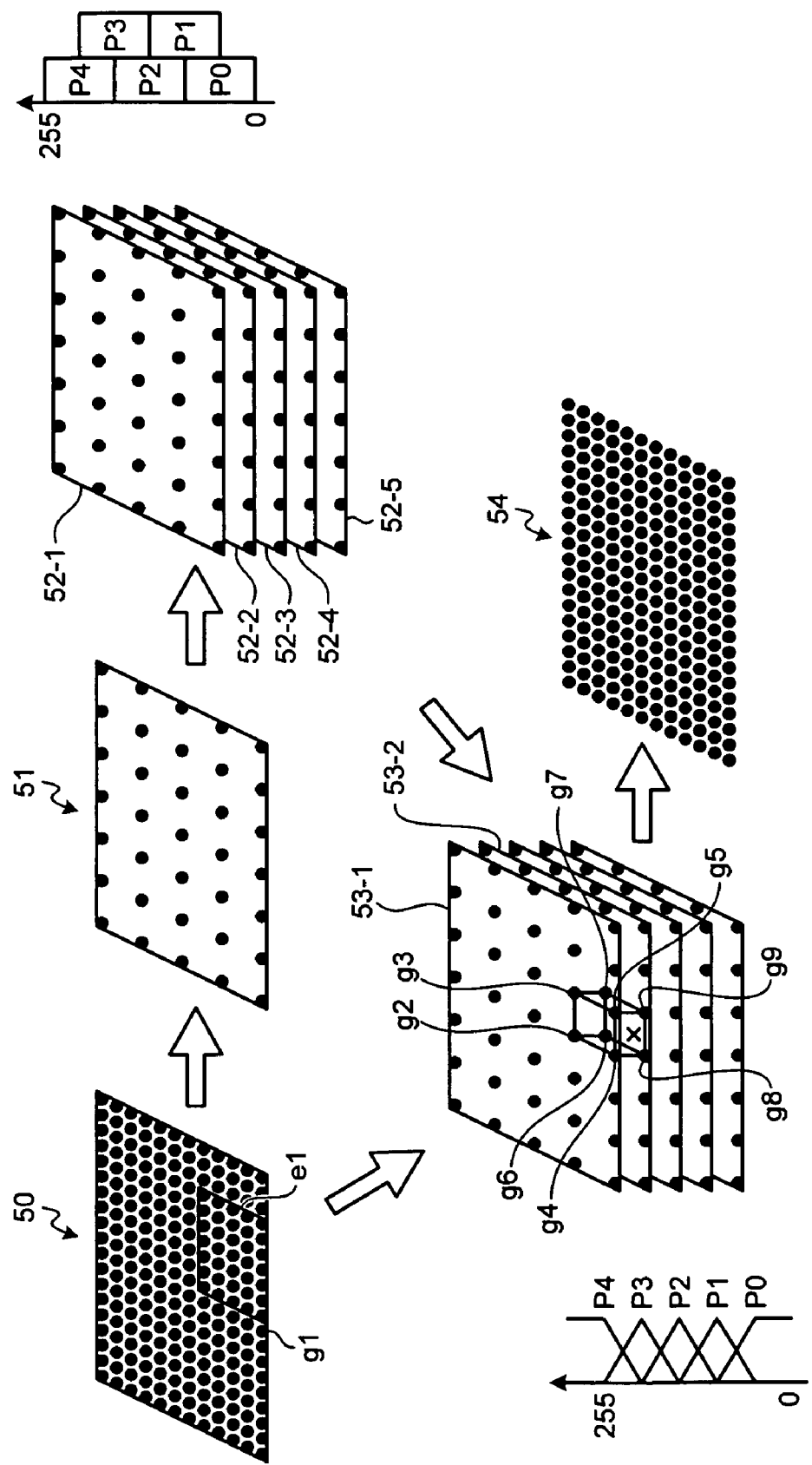
FIG. 21 is a schematic diagram explaining a combining process performed by the image processing apparatus in which the discrete low-pass filter is used.

A detailed description will be given with reference to FIG. 21. The "image processing apparatus" includes a plurality of low-pass filters, i.e., LPFs 0 to 4. In the LPFs 0 to 4, level values of 0 to 84 (P0), 42 to 128 (P1), 85 to 160 (P2), 129 to 212 (P3), and 161 to 255 (P4) are set, respectively. With this configuration, the "image processing apparatus" creates a reduced image 51 by extracting every third pixel in the vertical direction and the lateral direction from the pixels in an input image 50. Then, the LPFs 0 to 4 create level-value-limit smoothed images 52-1 to 52-5 by performing a level-value-limit smoothing process on the reduced image 51.

Thereafter, if the image processing apparatus selects, for example, a pixel g1 in the input image 50 as a pixel to be processed, the image processing apparatus selects the level-value-limit smoothed images 52-1 to 52-5 on the basis of the level value of the pixel g1. If the level value of the pixel g1 to be processed is included in a level-value limit range P4, the image processing apparatus selects the level-value-limit smoothed image 52-1, a pixel g2 in a level-value-limit smoothed image 53-1 that corresponds to the pixel g1 to be processed, and pixels g3 to g5 adjacent to the pixel g2. Furthermore, from among the pixels in a level-value-limit smoothed image 53-2 and whose level values are the closest to the level value range in the level-value-limit smoothed image 53-1, the image processing apparatus selects pixels g6 to g9 that correspond to pixels g2 to g5 in the level-value-limit smoothed image 53-1.

Then, the image processing apparatus inputs level values and location information (XY coordinates) of the selected eight pixels of g2 to g9, performs level-value interpolation (3D-interpolation), and enlarges a portion corresponding to a region e1 in the input image 50. At this time, from among the pixels located in the region e1 in the input image 50, if there are any pixels having level values that are not included in the level value range P4, the image processing apparatus selects level-value-limit smoothed images 52-2 and 52-3 within the level value ranges that include the level values of those pixels; performs 3D-interpolation using both the level values and the location information on the pixel that corresponds to the pixel g1 to be processed and on the pixels adjacent to that pixel; and enlarges the portion corresponding to the region e1 in the input image 50. Specifically, the image processing apparatus enlarges only the portion that corresponds to the region e1 of the level-value-limit smoothed images 52-1 to 52-5 in which the level values of the pixels in the region e1 in the input image 50 are included.

Subsequently, the image processing apparatus creates a smoothed image 54 by selecting, for each pixel in the region e1 in the input image 50 on the basis of the level values of the pixels, the level-value-limit smoothed images 53-1 to 53-$n$ and by then combining the level values. In the combining process, a weighting average value of the selected level values of the selected level-value-limit smoothed images is calculated in accordance with the difference between a central value of the level value range and the level value of the pixel to be processed. For example, if the level value of the pixel to be processed is 60, the level value range that includes 60 is the P0 with level values ranging from 0 to 84 and is the P1 with level values ranging from 42 to 128; therefore, the image processing apparatus selects the LPF 0 and the LPF 1. At this time, the central value of the level value range of the P0 is 42, and the central value of the level value range of the P1 is 85. Accordingly, "the image processing apparatus" performs weighting in such a manner that the weight of the pixel level value of the LPF 1 that has the central value of the level value close to the level value (60) of the pixel to be processed becomes large. If the input image is a reduced image, by further calculating an average value using location information (the vertical axis (X axis) and the lateral axis (Y axis)), "the image processing apparatus" creates a smoothed image by combining the created level-value-limit smoothed images. Specifically, the "image processing apparatus" performs a calculation given by, for example, "pixel level values of the LPF 1×(25/43)+pixel level values of the LPF 0×(18/43)".

In this way, for the created level-value-limit smoothed images, the "image processing apparatus" performs interpolation (3D-interpolation) on the level values and the location information of the pixel to be processed. Accordingly, it is possible to perform a process, at high speed, for accurately preserving an edge portion of an image and for blurring a portion other than the edge portion.

However, with the above described method, there is no way to control correction, in a reliable manner, in a region other than the image to be processed, and it is impossible to "control the noise removal level in accordance with high/low luminance when the noise of color is removed". Specifically, the method has an outstanding characteristic in that an edge portion is preserved in a high-quality manner and is also processed at high speed; however, the element that determines the filtering characteristic is an image that is itself to be processed (an image component to be processed itself). In general, the magnitude of noise of an image is not sometimes determined by the image to be processed itself. For example, components of an image are divided into color and luminance; noise of color has a property in which it is present in a low luminance area due to the sensitivity of a sensor. In a process for removing noise, it is difficult to completely prevent a side effect (e.g., fade in color); therefore, ideally, it is preferable to selectively perform noise removal, in an intensive manner, on a portion where noise is large. Accordingly, for example, when noise removal is performed on color, it is preferable to control the noise removal level in accordance with high/low luminance.

Outline and Features of the Image Processing Apparatus

Figure 1:
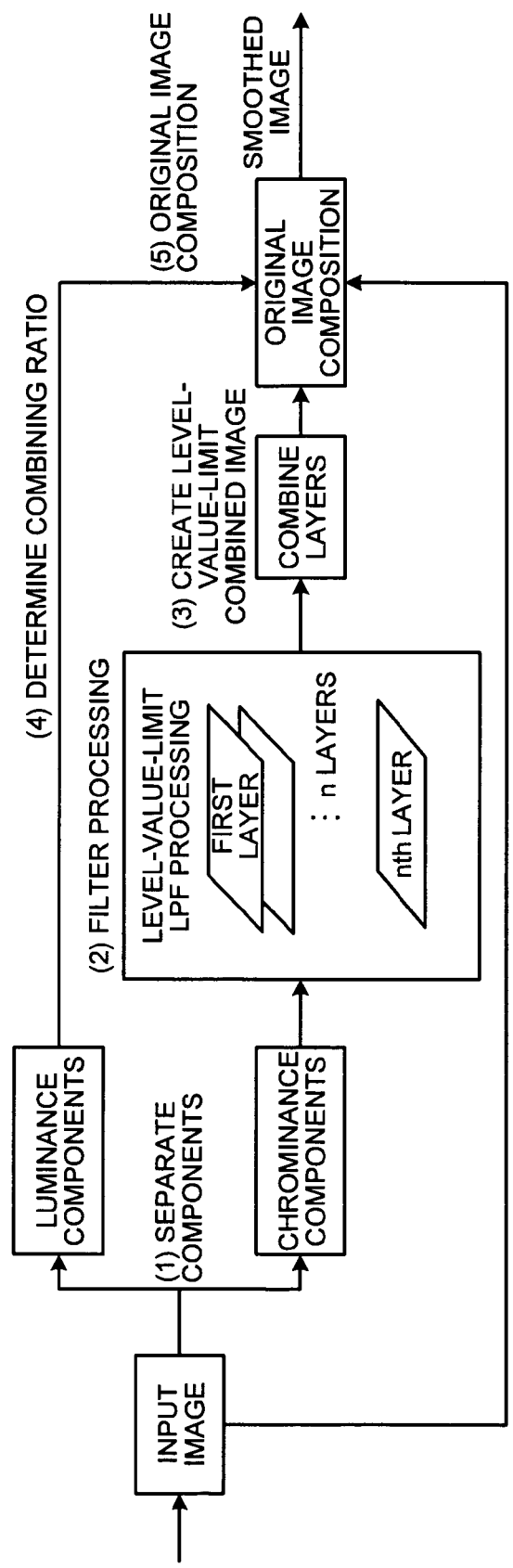
FIG. 1 is a schematic diagram explaining the outline and features of an image processing apparatus according to a first embodiment.

In the following, the outline and features of an image processing apparatus according to the first embodiment will be described with reference to FIG. 1. FIG. 1 is a schematic diagram explaining the outline and features of the image processing apparatus according to the first embodiment.

As illustrated in FIG. 1, the outline of the image processing apparatus is that it includes low-pass filters (LPFs) having both the first layer to the $n^{th}$ layer and different level values and creates, from an input image that is received, a smoothed image by blurring the input image. In particular, the image processing apparatus has a feature in that it can easily control noise removal levels at high speed.

The main features of the image processing apparatus are specifically described below. Using LPFs #0 to #n, which are a plurality of low-pass filters, to which different level value ranges are set, the image processing apparatus uses pixels in the input image as pixels to be processed; calculates, from the pixels in the input image that includes the pixels to be processed that are included within the filter size of the low-pass filters, an average value of the pixels included in the level value ranges; and creates a plurality of level-value-limit smoothed images that is limited by a plurality of level values (see (1) and (2) in FIG. 1). Specifically, the image processing apparatus separates the input image into chrominance components and luminance components. For the chrominance components separated from the input image, using the filters having n layers formed of the LPFs #0 to #n, the image processing apparatus creates, in a similar manner as described above, level-value-limit smoothed images. For example, each of the LPFs #0 to #n obtains, by referring to the pixels in the input image that is received, pixels within the level value range to which each individual LPF is set and calculate an average value (smoothing) by accumulating the level values of the pixels that are obtained. Furthermore, each of the LPFs #0 to #n performs the above process on the input image both in the lateral direction and the vertical direction, calculates an average value of the calculated values obtained in each direction, and sets the calculated average value as a result of smoothing performed on pixels in the input image.

Then, the image processing apparatus selects one or a plurality of the created level-value-limit smoothed images and creates a level-value combined image by combining the selected level-value-limit smoothed images (see (3) in FIG. 1). Specifically, the image processing apparatus selects, from a plurality of level-value-limit smoothed images that is created by the filters, level-value-limit smoothed images that correspond to level values of pixels in the input image. Then, for the pixels in the input image, the image processing apparatus creates a level-value-limit combined image that is a single combined image (frame) by combining a plurality of selected level-value-limit smoothed images. The level-value-limit smoothed images are combined in a similar manner as described in the above.

Thereafter, on the basis of image information that is different from image information related to an image constituting the input image that is used when a plurality of level-value-limit smoothed images is created, the image processing apparatus determines a combining ratio of the input image to the combined level-value combined image and creates a smoothed image by combining, using the determined combining ratio, the input image and the level-value combined image (see (4) and (5) in FIG. 1).

Specifically, on the basis of luminance components that are obtained by being separated from the input image and that are different from chrominance components corresponding to image information related to the image constituting the input image that is used when a plurality of level-value-limit smoothed images is created, the image processing apparatus determines the combining ratio of the input image, which is the original image, to the created level-value-limit combined image. For example, in the example described above, if the value of the luminance component that is different from the chrominance component of the input image used when a plurality of the level-value-limit smoothed images is created is large, the image processing apparatus determines a combining ratio in such a manner that the ratio of the input image is high and the ratio of the level-value-limit combined image is low. If the value of the luminance component is small, the image processing apparatus determines a combining ratio in such a manner that the ratio of the input image is low and the ratio of the level-value-limit combined image is high. Then, the image processing apparatus create a smoothed image by combining, on the basis of the determined combining ratio, the input image and the level-value combined image.

In this way, the image processing apparatus according to the first embodiment can perform, at high speed, the edge preserving smoothing process in accordance with image components other than image components that are themselves to be processed and can also combine the input image and the level-value-limit combined image independently of the discrete low-pass filter. As a result, it is possible to easily control the noise removal level at high speed.

Configuration of the Image Processing Apparatus

Figure 2:
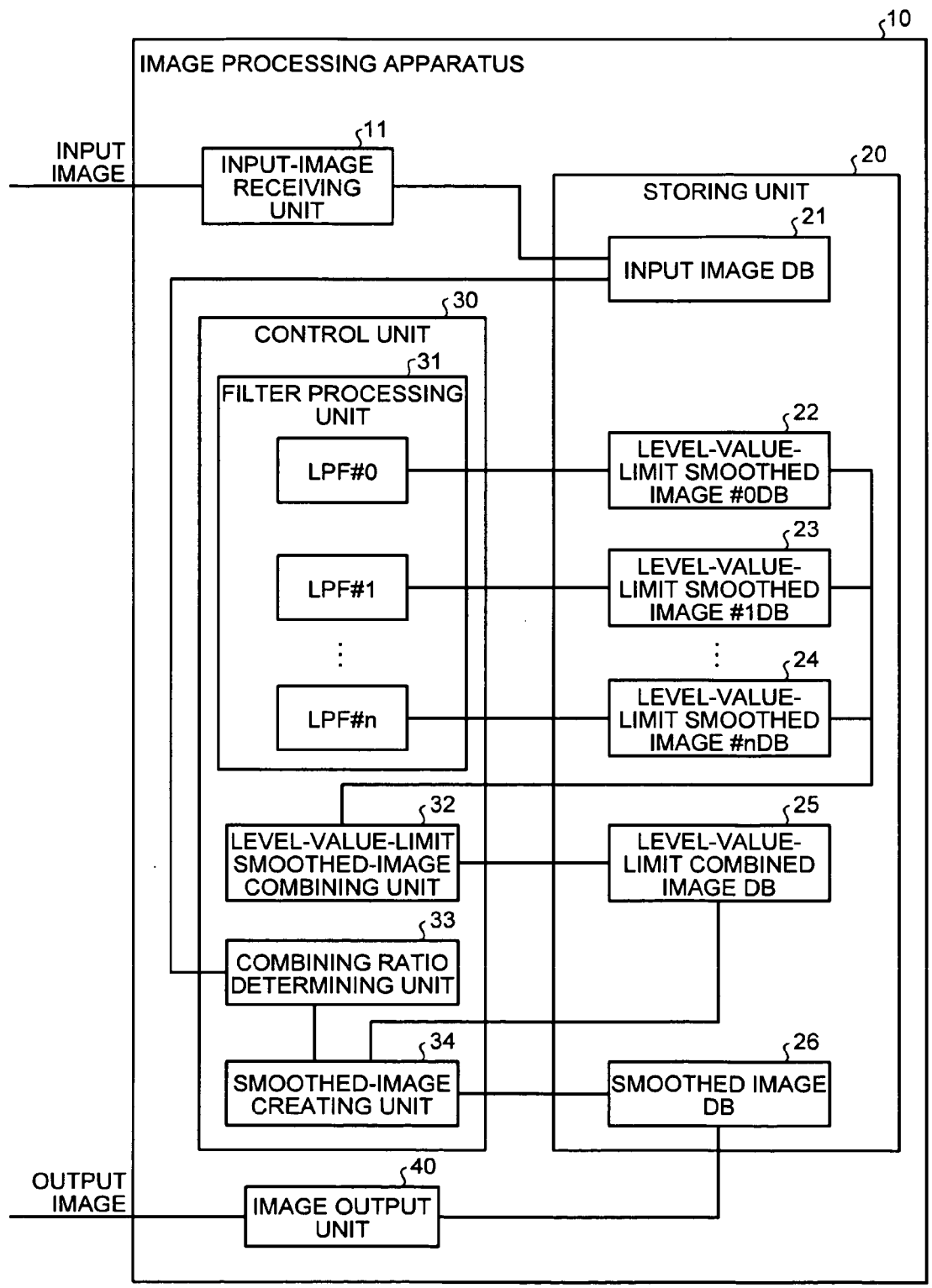
FIG. 2 is a block diagram illustrating the configuration of the image processing apparatus according to the first embodiment.

In the following, the configuration of the image processing apparatus illustrated in FIG. 1 will be described with reference to FIG. 2. FIG. 2 is a block diagram illustrating the configuration of the image processing apparatus according to the first embodiment. As illustrated in FIG. 2, an image processing apparatus 10 includes an input-image receiving unit 11, a storing unit 20, a control unit 30, and an image output unit 40.

The input-image receiving unit 11 receives moving image data or the like from outside. Specifically, the input-image receiving unit 11 receives moving image data frame by frame and stores the received frames as input images in an input image DB 21, which will be described later. Furthermore, the input-image receiving unit 11 can also receives input images from an external unit via a network or from a storage medium such as a compact disk read only memory (CD-ROM) or a digital versatile disk (DVD). The input images can be moving images or still images, and also can be color images or monochrome images. Furthermore, the input images can be reduced images. In such a case, a smoothed-image creating unit 34, which will be described later, performs an enlarging process.

The storing unit 20 stores therein data and programs needed for various kinds of processes performed by the control unit 30. The storing unit 20 includes the input image DB 21, a level-value-limit smoothed image #0DB 22, a level-value-limit smoothed image #1DB 23, a level-value-limit smoothed image #nDB 24, a level-value-limit combined image DB 25, and a smoothed image DB 26, which are particularly and closely related to the present invention.

The input image DB 21 stores therein frames that are input to the image processing apparatus 10. Specifically, the input image DB 21 stores therein, using the input-image receiving unit 11, an $N^{th}$ frame of the moving image data, an $N+1^{th}$ frame, or the like.

The level-value-limit smoothed images #0DB 22 to #nDB 24 stores therein the level-value-limit smoothed images created by the LPFs #0 to #n in a filter processing unit 31, which will be described later. Specifically, the level-value-limit smoothed images #0DB 22 to #nDB 24 are DBs; the number of the DBs is the same as that of the LPFs included in the filter processing unit 31, which will be described later, and each DB is associated with a corresponding LPF. For example, the level-value-limit smoothed image #0DB 22 stores therein a plurality of smoothed images having level values that are stored by the LPF #0 (for example, 0 pixels to 40 pixels). Similarly, the level-value-limit smoothed image #1DB 23 stores therein a plurality of smoothed image having level values that are stored by the LPF #1 (for example, 30 pixels to 60 pixels). The level-value-limit smoothed image #nDB 24 stores therein a plurality of smoothed images having level values that are stored by the LPF #n (for example, 210 pixels to 255 pixels).

The level-value-limit combined image DB 25 stores therein a level-value-limit combined image that is a combination of level-value-limit smoothed images created by the LPFs #0 to #n in the filter processing unit 31, which will be described later. Specifically, the level-value-limit combined image DB 25 stores therein a level-value-limit combined image in which the level-value-limit smoothed images that are created by the LPFs #0 to #n in the filter processing unit 31 and that are stored in the level-value-limit smoothed images #0DB 22 to #nDB 24 are combined by a later-described level-value-limit smoothed-image combining unit 32.

The smoothed image DB 26 stores therein the created smoothed images. Specifically, when color noise is removed from the smoothed image stored by the smoothed-image creating unit 34, which will be described later, the smoothed image DB 26 stores therein the smoothed image in which an edge portion where the noise removal level is controlled in accordance with high/low luminance is accurately preserved and in which a portion other than the edge portion is blurred (smoothed).

The control unit 30 has a control program such as an operating system (OS) and an internal memory for storing necessary data and programs prescribing various kinds of procedures. The control unit 30 includes the following units that are particularly as closely related to the present invention: the filter processing unit 31, the level-value-limit smoothed-image combining unit 32, a combining ratio determining unit 33, and the smoothed-image creating unit 34. These units execute various kinds of processes.

The filter processing unit 31 performs, using a plurality of low-pass filters to which different level value ranges are set, a filtering process on the chrominance components of the input image and creates a plurality of filtering results. The filter processing unit 31 includes the LPFs #0 to #n, which are closely related to the present invention.

The LPFs #0 to #n use pixels in the input image as pixels to be processed; calculate, from the pixels in the input image that includes the pixels to be processed that are included within the filter size of the low-pass filters, an average value of pixels included in the level value ranges; and create a plurality of level-value-limit smoothed images that is limited by a plurality of level values. Specifically, the LPFs #0 to #n are one-dimensional low-pass filters to which different level value ranges are set in advance. The LPFs #0 to #n use pixels whose level values in the input image stored in the storing unit are within the level value range to which each individual LPF is set as pixels to be processed; create the level-value-limit smoothed images by performing a level-value-limit smoothing process in which smoothing (calculation of an average value) is performed; and store the created level-value-limit smoothed images in the corresponding level-value-limit smoothed image DB (for example, in a case of the LPF #0, the created image is stored in the level-value-limit smoothed image DB #0). The level value ranges that are set in the LPFs are preferably set such that a part of a level value range falls within the range of at least two LPFs; however, it is not limited thereto as long as the level value ranges cover the level value range of the input image. Furthermore, for each of the filter sizes and level value ranges of the LPFs, a fixed value can be set thereto in advance or a value can be set thereto from outside.

For example, if the LPFs #0 to #n are 17 layers of LPFs 1 to 17, level value ranges are set, from LPF1-1 to LPF1-17 in this order, 0-16, 0-32, 16-48, 32-64, 48-80, 64-96, 80-112, 96-128, 112-144, 128-160, 144-176, 160-192, 176-208, 192-224, 208-240, 224-255, and 240-255, and the filter size is set to, for example, 15 for all of the LPFs. The number of layers is not limited thereto; any number of layers can of course be used. As described above, for the level value ranges to which the LPFs are set, it is preferable that a part of a level value range falls within the range of at least two LPFs; however, it is not limited thereto as long as the level value ranges cover the level value range of the input image.

The level-value-limit smoothed-image combining unit 32 selects one or a plurality of level-value-limit smoothed images that is created by the filter processing unit 31 and creates a level-value combined image by combining the selected level-value-limit smoothed images. Specifically, from a plurality of the level-value-limit smoothed images #0DB 22 to #nDB 24, which are created by and stored the filter processing unit 31, the level-value-limit smoothed-image combining unit 32 selects level-value-limit smoothed images that correspond to the level values of the pixels in the input image. Then, for the pixels in the input image, the level-value-limit smoothed-image combining unit 32 combines the plurality of selected level-value-limit smoothed images to create a single level-value-limit combined image, i.e., a single combined image (frame) and stores it in the level-value-limit combined image DB25. Methods of selecting and combining images are the same as those described above; therefore, descriptions thereof in detail are not repeated here.

On the basis of image information that is different from image information related to an image constituting the input image that is used when a plurality of level-value-limit smoothed images is created by the filter processing unit 31, the combining ratio determining unit 33 determines a combining ratio of the input image to a level-value combined image that is combined by the level-value-limit smoothed-image combining unit 32 and notify the smoothed-image creating unit 34 of the determined combining ratio. Specifically, on the basis of luminance components that are obtained by being separated from the input image and that are different from chrominance components that correspond to image information related to the image constituting the input image that is used when a plurality of level-value-limit smoothed images is created, the combining ratio determining unit 33 determines a combining ratio of the input image, which is the original image, to the created level-value-limit combined image. For example, in the example described above, if a value of the luminance component that is different from the chrominance component of the input image used when a plurality of the level-value-limit smoothed images is created is large, the combining ratio determining unit 33 determines a combining ratio in such a manner that the ratio of the input image is high and the ratio of the level-value-limit combined image is low. If the value of the luminance component is small, the combining ratio determining unit 33 determines the combining ratio in such a manner that the ratio of the input image is low and the ratio of the level-value-limit combined image is high. Then, the combining ratio determining unit 33 notifies the smoothed-image creating unit 34 of the determined combining ratio.

Using the combining ratio determined by the combining ratio determining unit 33, the smoothed-image creating unit 34 creates a smoothed image by combining the input image and the level-value combined image. Specifically, if the combining ratio determining unit 33 determines the combining ratio of "input image to level-value-limit combined image" is "7:3", the smoothed-image creating unit 34 creates a smoothed image by setting the rate of the input image stored in the input image DB 21 to "7" and the rate of the level-value-limit combined image stored in the level-value-limit combined image DB 25 to "3" and then stores the created smoothed image in the smoothed image DB 26.

In the following, a method of determining a combining ratio performed by the combining ratio determining unit 33 and a method of combining images performed by the smoothed-image creating unit 34 will be described in detail with reference to FIGS. 3 to 7. FIG. 3 is a schematic diagram illustrating Y components that are separated from an input image. FIG. 4 is a schematic diagram illustrating Cr components that are separated from the input image. FIG. 5 is a schematic diagram illustrating Cr components of an input image that is subjected to smoothing. FIG. 6 is a schematic diagram illustrating a smoothed image created by combining original images using a combining ratio. FIG. 7 is a schematic diagram illustrating a smoothed image created by combining original images using a nonlinear combining ratio in high luminance regions.

As described above, a smoothing process for removing noise contained in the chrominance components of an image will be described. The chrominance components correspond to, for example, two components (i.e., Cb and Cr) from among three components (i.e., Y, Cb, and Cr), which are typically used in the image processing field. In this specification, 8-bit data, ranging from 0 to 255, is assumed to be processed. In such a case, 128 represents an achromatic color in both Cb and Cr components.

In this state, after the combining ratio determining unit 33 divides the input image into two components, i.e., a Y component and Cb and Cr components, in the filter processing unit 31, the Cb and Cr components become the components to be processed for smoothing, and the Y component becomes a target component that is used for determining a combining ratio. Signals of the chrominance components can be obtained by dividing an RGB value into two components, i.e., a Y component and Cb and Cr components, using a typical matrix computation. FIG. 3 is a schematic diagram illustrating that the Y components, which are extracted from the input image, are associated with the pixels in the input image and are converted into numbers. FIG. 4 is a schematic diagram illustrating the Cr components obtained in a similar manner. When FIG. 3 is compared with FIG. 4, it is detected that, at the upper left of the input image, the values of the chrominance components are greater than those of the luminance components, whereas, at the upper right of the input image, the values of the luminance components are greater than those of the chrominance components.

Then, LPFs in the filter processing unit 31, to which different level value ranges are set in advance, use pixels whose level values in the input image are within the level value range to which each individual LPF is set as pixels to be processed and create level-value-limit smoothed images on which smoothing (calculation of an average value) is performed. The level-value-limit smoothed-image combining unit 32 selects, on the basis of the level values of the pixels in the input image, level-value-limit smoothed images corresponding to those pixels and combines them using an interpolation process to create a level-value-limit combined image, which is illustrated in FIG. 5. As illustrated in FIG. 5, the Cr components of the smoothed input image are uniformly smoothed, when compared with an example illustrated in FIG. 4.

Then, on the basis of the luminance components illustrated in FIG. 4, as described above, if the combining ratio determining unit 33 strengthens the noise removal level of the low luminance portion and weakens the noise removal level of the high luminance portion, the combining ratio determining unit 33 determines the equation given by "Out=(L*(255−Y)+ In*Y)/255" as a combining ratio, where In represents an input image, L represents an LPF result, Out represents an output, and Y represents luminance of the target pixel. As illustrated in FIG. 6, using the determined equation for that calculation, the smoothed-image creating unit 34 performs original image composition by combining the input image (see FIG. 4) and the level-value-limit combined image (see FIG. 5). In this way, when the smoothed image subjected to original image composition illustrated in FIG. 6 is compared with the input image (original image) illustrated in FIG. 4 and the level-value-limit smoothed image (smoothing result) illustrated in FIG. 5, it can be seen that, in the smoothed image illustrated in FIG. 6, strong correction is performed at the upper left of the drawing that corresponds to a low luminance portion in the smoothed image in which level values are limited (see FIG. 5), whereas weak correction is performed at the upper right of the drawing that corresponds to a high luminance portion in the smoothed image. In other words, in FIG. 6, at the upper left of the drawing that corresponds to the low luminance portion, the rate of the input image that is illustrated in FIG. 4 is small and a rate of the level-value-limit combined image that illustrated in FIG. 5 is large. Furthermore, at the upper right of the drawing that corresponds to the high luminance portion, the rate of the input image that is illustrated in FIG. 4 is large and the rate of the level-value-limit combined image that is illustrated in FIG. 5 is small.

Furthermore, in the equation described above, linear interpolation is simply performed in accordance with luminance; however, it is not limited thereto. For example, combining equation (combining ratio) such as "if Y<255/2, Out=(L* (255−Y)+In*Y)/255, else Out=(In+L)/2" can be used if a nonlinear control is performed in which the correction amount is not set to "0" in a high luminance portion and a constant correction level is used for a certain level of high luminance portion. If the combining process is performed using the above equation, the result illustrated in FIG. 7 can be obtained. In FIG. 7, the correction performed at the upper right of the drawing that corresponds to the high luminance portion is different from the one illustrated in FIG. 6 in which "0" is used for the amount of correction in the high luminance portion.

The image output unit 40 outputs the created smoothed image to another device connected thereto. Specifically, the image output unit 40 obtains a smoothed image that is created by the smoothed-image creating unit 34 and stored in the smoothed image DB 26. Then, the image output unit 40 outputs the image to, for example, a dynamic range device that performs dynamic range compression in which a backlight image is corrected.

Processes Performed by the Image Processing Apparatus

Figure 8:
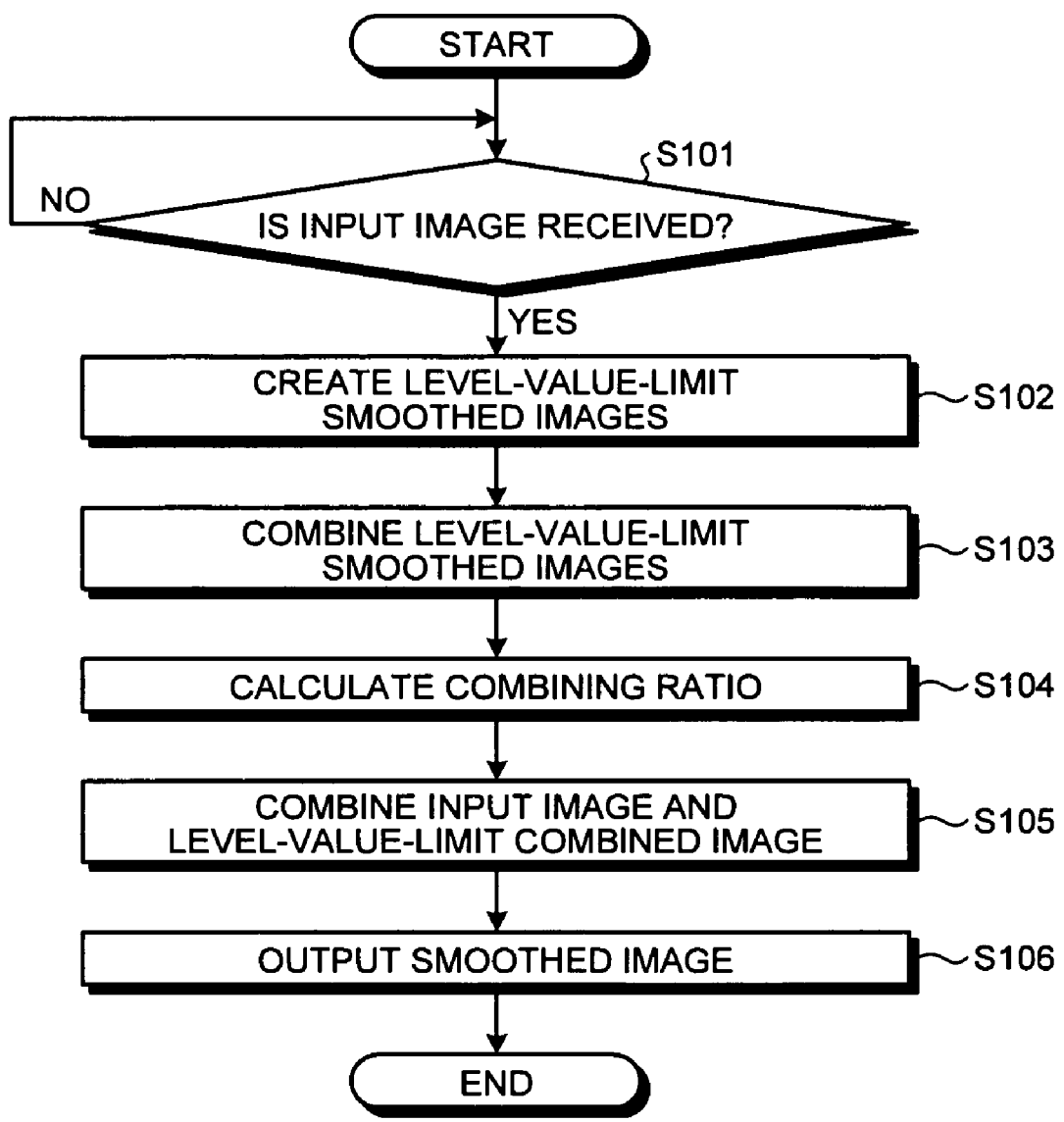
FIG. 8 is a flowchart illustrating the flow performed by the image processing apparatus according to the first embodiment.

In the following, a process performed by the image processing apparatus will be described with reference to FIG. 8. FIG. 8 is a flowchart illustrating the flow performed by the image processing apparatus according to the first embodiment.

As illustrated in FIG. 8, if an input image is received by the input-image receiving unit 11 and stored in the input image DB 21 (Yes at Step S101), the LPFs #0 to #n in the filter processing unit 31 create level-value-limit smoothed images and store them in the corresponding level-value-limit smoothed images #0DB 22 to #nDB 24 (Step S102).

Then, the level-value-limit smoothed-image combining unit 32 creates a combined level-value combined image by selecting, from the level-value-limit smoothed images #0DB 22 to #nDB 24, one or a plurality of level-value-limit smoothed images, which are created by the filter processing unit 31, and stores the created level-value-limit combined image in the level-value-limit combined image DB25 (Step S103).

Subsequently, the combining ratio determining unit 33 obtains the input image that is stored in the input image DB 21; calculates, from the obtained input image, a combining ratio; and notifies the smoothed-image creating unit 34 of the combining ratio (Step S104). On the basis of the notified combining ratio, the smoothed-image creating unit 34 creates a smoothed image by combining the input image stored in the input image DB 21 and the level-value-limit combined image stored in the level-value-limit combined image DB 25 and stores the created smoothed image in the smoothed image DB 26 (Step S105).

Then, the image output unit 40 obtains the smoothed image that is created by the smoothed-image creating unit 34 and that is stored in the smoothed image DB 26 and outputs it to, for example, the dynamic range device that performs dynamic range compression in which a backlight image is corrected.

Advantage of the First Embodiment

As described above, according to the first embodiment, using a plurality of low-pass filters, i.e., the LPFs #0 to #n, to which different level value ranges are set, the image processing apparatus uses pixels in the input image as pixels to be processed; calculates, from the pixels in the input image that includes the pixels to be processed included within the filter size of the low-pass filters, an average value of the pixels included in the level value ranges; and creates a plurality of level-value-limit smoothed images that is limited by a plurality of level values. Then, the image processing apparatus selects one or a plurality of created level-value-limit smoothed images and creates a level-value combined image by combining the selected level-value-limit smoothed images. On the basis of image information that is different from image information related to an image constituting the input image that is used when a plurality of level-value-limit smoothed images is created, the image processing apparatus determines the combining ratio of the input image to the combined level-value combined image and creates a smoothed image by combining, using the determined combining ratio, the input image and the level-value combined image. Accordingly, it is possible to perform an edge preserving smoothing process at high speed and also to combine, independently of the discrete low-pass filter, the input image and the level-value combined image. As a result, the noise removal level can be easily controlled at high speed.

Furthermore, according to the first embodiment, in accordance with components that are different from the components to be processed that are used when a plurality of level-value-limit smoothed images is created, the image processing apparatus determines the combining ratio of the input image to the combined level-value combined image and creates a smoothed image by combining, using the determined combining ratio, the input image and the level-value combined image. Accordingly, it is possible to control, at high speed, noise removal levels in accordance with image components other than image components that are themselves to be processed.

Furthermore, according to the first embodiment, for chrominance component information in the input image, using a plurality of low-pass filters to which different level value ranges are set, the image processing apparatus uses pixels in the input image as pixels to be processed; calculates, from the pixels in the input image that includes the pixels to be processed included within the filter size of the low-pass filters, an average value of the pixels included in the level value ranges; and creates a plurality of level-value-limit smoothed images that is limited by a plurality of level values. Then, on the basis of luminance component information that is different from chrominance component information that is used when a plurality of level-value-limit smoothed images is created, the image processing apparatus determines the combining ratio of the input image to the combined level-value combined image and creates a smoothed image by combining, using the determined combining ratio, the input image and the level-value combined image. Accordingly, it is possible to control the noise removed from the chrominance components in accordance with low/high luminance.

Furthermore, According to the first embodiment, if the amount of luminance component information is greater than that of the chrominance component information that is used when a plurality of level-value-limit smoothed images is created, the image processing apparatus determines the combining ratio in such a manner that the ratio of the input image is higher than that of the combined level-value combined image and creates a smoothed image by combining, using the determined combining ratio, the input image and the level-value combined image. Accordingly, it is possible to strengthen the noise removal level in a low luminance portion and weaken the noise removal level in a high luminance portion. For example, it is possible to reduce correction if the ratio of the input image is made high.

[b] Second Embodiment

In the first embodiment, a case in which the noise removal level of a chrominance component in the input image is controlled is described; however, the present invention is not limited thereto. For example, the present invention can also control the noise removal level of a luminance component in the input image.

Figure 9:
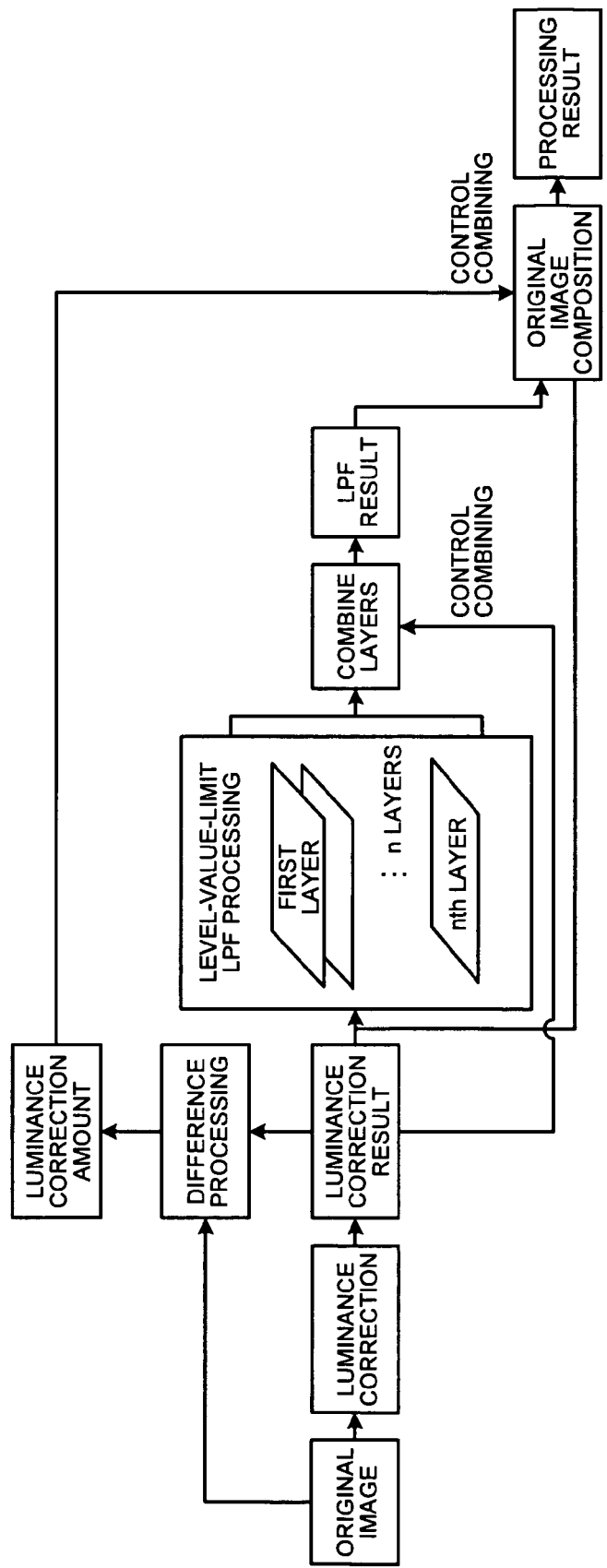
FIG. 9 is a schematic diagram illustrating the overall configuration of an image processing apparatus according to a second embodiment.

Thus, in a second embodiment, a case in which a noise removal level of the luminance component in the input image is controlled will be described with reference to FIGS. 9 to 14. FIG. 9 is a schematic diagram illustrating the overall configuration of the image processing apparatus according to a second embodiment. Because noise of the luminance component depends on the amount of correction of the luminance level, such as gain correction, in this specification, there will be a description of noise removal after a luminance correction (grayscale correction) is performed.

As illustrated in FIG. 9, the image processing apparatus receives an image in which luminance correction is performed on the original image as an input image and creates, in a similar manner as in the first embodiment, using a plurality of LPFs in which level values are limited, level-value-limit smoothed images. Then, the image processing apparatus creates a combined level-value-limit combined image by selecting one or a plurality of level-value-limit smoothed images. Furthermore, the original image and the input image that is subjected to luminance correction are stored in the input image DB 21 in an associated manner.

Thereafter, unlike the first embodiment, when the image processing apparatus according to the second embodiment combines the input image and the level-value-limit combined image (original image composition), the image processing apparatus calculates the difference between the original image and the input image; determines, on the basis of the luminance correction amount that corresponds to the calculated difference, a combining ratio; and creates, using the determined combining ratio, a smoothed image by combining the input image and the level-value-limit combined image.

In the following, there will be a description in detail, with reference to FIGS. 10 to 14, of a case in which a control is performed on the noise removal level of the luminance component in the input image, i.e., a smoothed image is created by calculating the difference between the original image and the input image; by determining a combining ratio on the basis of the luminance correction amount that corresponds to the calculated difference; and by combining the input image and the level-value-limit combined image. FIG. 10 is a schematic diagram illustrating Y components separated from an original image according to the second embodiment. FIG. 11 is a schematic diagram illustrating Y components separated from an input image according to a second embodiment. FIG. 12 is a schematic diagram illustrating Y components of an input image that is subjected to smoothing. FIG. 13 is a schematic diagram illustrating a luminance correction amount. FIG. 14 is a schematic diagram illustrating a smoothed image created by combining original images using a combining ratio according to the second embodiment.

As described above, a smoothing process for removing noise of the luminance component in an image will be described. The chrominance components correspond to, for example, two components (i.e., Cb and Cr) from among three components (i.e., Y, Cb, and Cr), which are typically used in the image processing field. In this specification, 8-bit data, ranging from 0 to 255, is assumed to be processed. In such a case, 128 represents an achromatic color in both Cb and Cr components.

In this state, the input-image receiving unit 11 receives an image in which luminance correction is performed on the original image as an input image. For example, Y components like that illustrated in FIG. 10 in the original image receives the input image that is subjected to luminance correction as illustrated in FIG. 11. By comparing FIGS. 10 and 11, it can be seen that the pixels in the upper left of FIG. 10 become large in FIG. 11; in FIG. 10, luminance components in the original image are small, whereas in FIG. 11, luminance components are corrected. The change in pixel size indicates that luminance correction is performed.

Thereafter, in a similar manner as in the first embodiment, the LPFs, in the filter processing unit 31 and to which different level value ranges are set, use pixels, in the input image and whose level values are within the level value range to which each individual LPF is set, as pixels to be processed and creates level-value-limited smoothed images subjected to smoothing (calculation of an average value). On the basis of the level values of the pixels in the input image, the level-value-limit smoothed-image combining unit 32 selects the level-value-limit smoothed images with respect to the pixels and combines them using an interpolation process to create a level-value-limit combined image, which is illustrated in FIG. 12.

Then, as illustrated in FIG. 13, the combining ratio determining unit 33 calculates the difference between luminance components of the original image illustrated in FIG. 10 and luminance components in the input image subjected to the luminance correction illustrated in FIG. 11. If the luminance correction is performed on the original image and if the combining ratio is controlled in accordance with the correction amount, the combining ratio determining unit 33 determines that an equation given as "Out=(In*(255−C)+L*C)/255" be used as the combining ratio for the original image, where In represents the original image, L represents an LPF result, Out represents an output, and C represents a luminance correction amount of the pixels. The larger the amount by which the pixel is corrected, the stronger the LPF that is applied to the pixel; therefore, for example, a retinex method can be used for luminance correction. Thereafter, as illustrated in FIG. 14, the smoothed-image creating unit 34 creates, using the determined equation (combining ratio), a smoothed image by combining the input image (see FIG. 11) and the level-value-limit combined image (see FIG. 12). In FIG. 14, as can be understood from the combined result, the rate of the input image (see FIG. 11) is large at the upper part of the drawing in which the amount of the luminance correction small, whereas the rate of the level-value-limit combined image (see FIG. 12) is large at the upper right of the drawing in which the amount of the luminance correction is large.

Advantage of the Second Embodiment

As described above, according to the second embodiment, on the basis of grayscale correction information that indicates information on a grayscale correction process obtained from the input image, the image processing apparatus determines the combining ratio of the input image to the combined level-value combined image and creates a smoothed image by combining, using the determined combining ratio, the input image and the level-value combined image. Accordingly, it is possible to control the noise removal level in accordance with the correction amount with respect to luminance.

[c] Third Embodiment

The embodiments of the present invention have been described; however, the present invention is not limited thereto and can be implemented with various kinds of embodiments. Therefore, as described below, another embodiment will be described under the following catego- ries: (1) combining using an amount of edge enhancement correction, (2) the number of filters, (3) system configuration, etc., and (4) programs.

(1) Combining Using an Amount of Edge Enhancement Correction

In the second embodiment, the description is given of a combining method that is performed in a case in which noise removal after the correction process (grayscale correction) is performed on luminance, i.e., a case in which an image where the luminance correction is performed on the original image is received as an input image; however, the present invention is not limited thereto. For example, the combining can be performed on the basis of a correction amount according to edge enhancement or edge correction performed on the original image.

Figure 15:
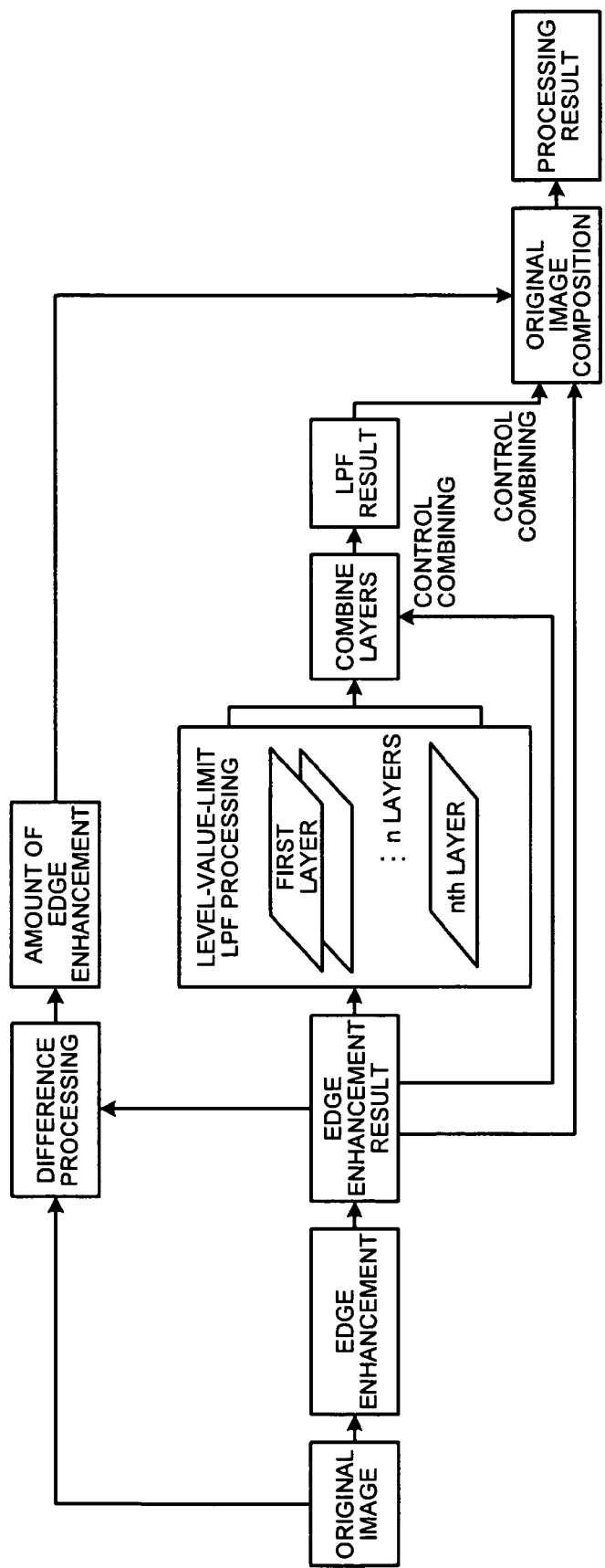
FIG. 15 is a schematic diagram illustrating the overall configuration of the image processing apparatus used in a case in which images are combined using an amount of edge enhancement.

Specifically, as illustrated in FIG. 15, the image processing apparatus receives an image in which edge enhancement correction is performed, using a method such as unsharp mask (USM), on the original image as an input image; creates, in a similar manner as in the second embodiment, using a plurality of LPFs in which level values are limited, level-value-limit smoothed images; and then, creates a combined level-value-limit combined image by selecting one or a plurality of the level-value-limit smoothed images. In this specification, the input image DB 21 stores therein the original image and the input image subjected to luminance correction in an associated manner. FIG. 15 is a schematic diagram illustrating the overall configuration of the image processing apparatus used in a case in which images are combined using an amount of edge enhancement.

Unlike the first and second embodiments, if the image processing apparatus combines the input image and the level-value-limit combined image (original image composition), the image processing apparatus calculates the difference between the original image and the input image; determines a combining ratio in accordance with the amount of edge enhancement that is the calculated difference; and creates a smoothed image by combining, using the determined combining ratio, the input image and the level-value-limit combined image.

For example, noise depends on the amount of the edge enhancement; however, because a portion subjected to extremely strong edge enhancement is a noticeable portion, it is preferable that the portion be not blurred using LPFs. Therefore, it is preferable to selectively perform filtering to remove noise on a portion in which edge enhancement is performed using a relatively larger value. Thus, the image processing apparatus determines that an equation given as "if S>50, Out=In, else if S>25, Out=(In*(S−25)+L*(50−S))/25, else Out=(In*(25−S)+L(S))/25" be used as a combining ratio, where In represents the original image, L represents an LPF result, Out represents an output, and S represents the amount of edge correction of the target pixel. Then, the image processing apparatus combines the input image and the level-value-limit combined image using the combining ratio.

(2) The Number of Filters

Furthermore, in the present invention, the number of filters is not limited to that illustrated in the drawing. For example, the number of filters can be three or ten. Furthermore, the level ranges (grayscale range) that are set in the filters are not limited to the values described in the embodiments; they can be arbitrarily set.

(3) System Configuration, Etc.

Of the processes described in the embodiments, the whole or a part of the processes that are mentioned as being automatically performed can be manually performed, or the whole or a part of the processes that are mentioned as being manually performed can be automatically performed using known methods. Furthermore, process procedures, the control procedures, the specific names, and the information containing various kinds of data or parameters indicated in the above specification and drawings can be arbitrarily changed unless otherwise noted.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. Furthermore, all or any part of the processing functions performed by each unit can be implemented by a CPU serving as a computing processing unit and programs analyzed and executed by the CPU or implemented as hardware by wired logic.

(4) Programs

Various kinds of processing described in the embodiments can be implemented by executing programs written in advance for a computer such as a personal computer or a workstation. Accordingly, a computer system that executes programs having the same function as those in the above-described embodiment is described in another embodiment below.

Figure 16:
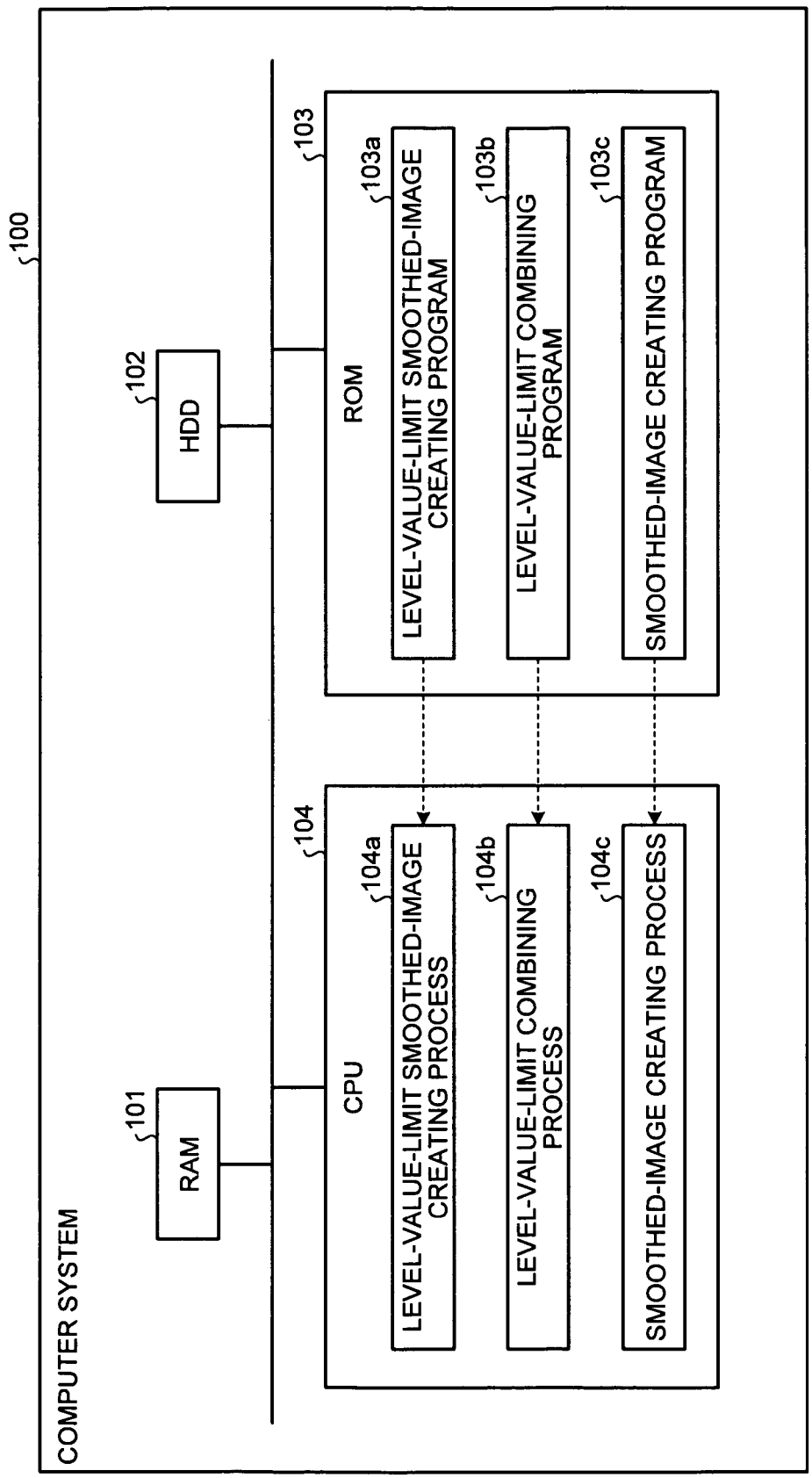
FIG. 16 is a block diagram illustrating an example of a computer system that executes an image processing program.
Figure 17:
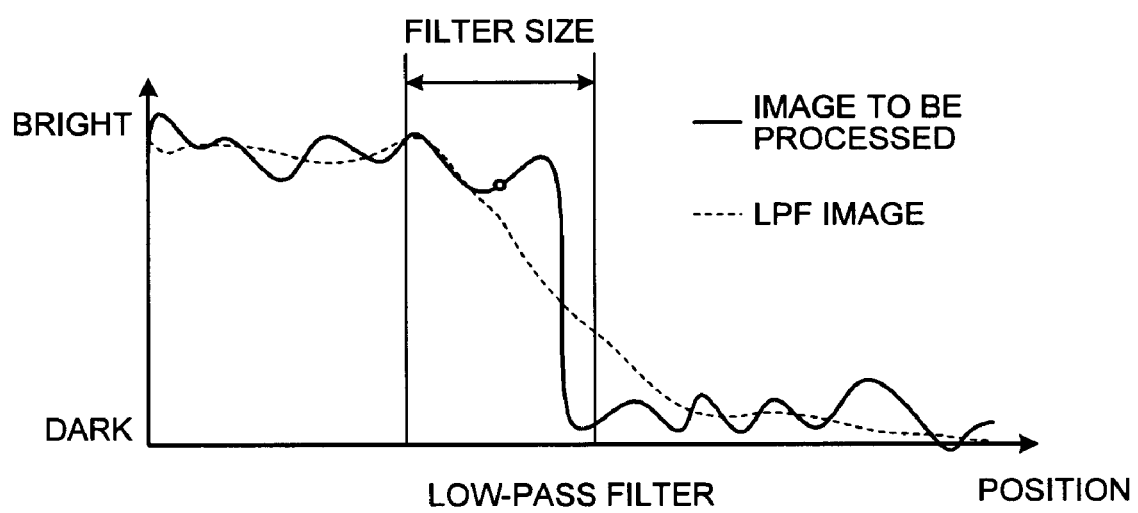
FIG. 17 is a schematic diagram explaining a conventional technology.
Figure 18:
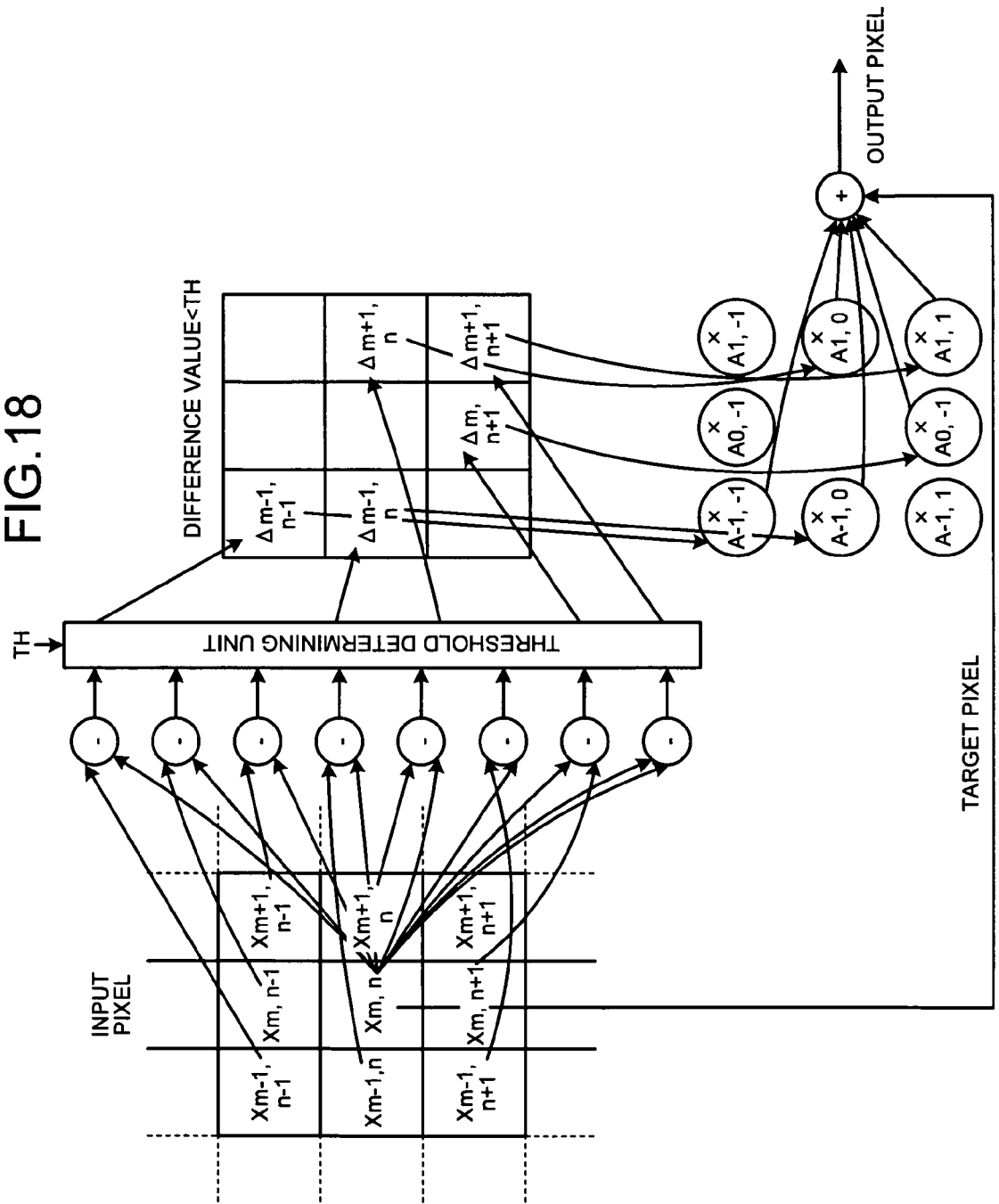
FIG. 18 is a schematic diagram explaining the conventional technology.
Figure 19:
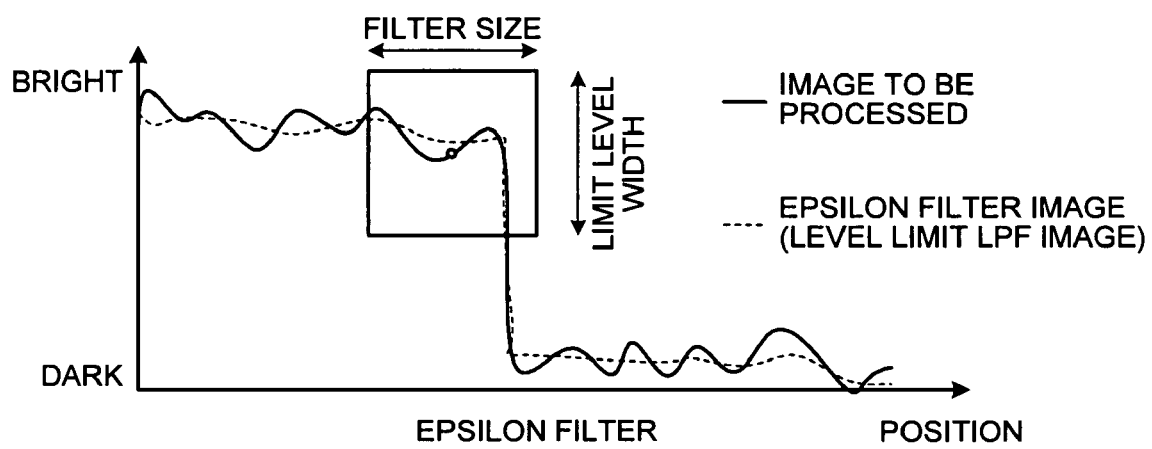
FIG. 19 is a schematic diagram explaining the conventional technology.

FIG. 16 is a block diagram illustrating an example of a computer system that executes an image processing program. As illustrated in FIG. 16, a computer system 100 includes a RAM 101, an HDD 102, a ROM 103, and a CPU 104. The ROM 103 stores therein, in advance, programs exhibiting the same function as the above-described embodiments, i.e., as illustrated in FIG. 16, a level-value-limit smoothed-image creating program 103a, a level-value-limit combining program 103b, and a smoothed-image creating program 103c.

As illustrated in FIG. 16, by reading and executing these programs 103a to 103c, the CPU 104 functions as a level-value-limit smoothed-image creating process 104a, a level-value-limit combining process 104b, and a smoothed-image creating process 104c. Furthermore, the level-value-limit smoothed-image creating process 104a corresponds to the filter processing unit 31 illustrated in FIG. 2. Similarly, the level-value-limit combining process 104b corresponds to the level-value-limit smoothed-image combining unit 32, and the smoothed-image creating process 104c corresponds to the combining ratio determining unit 33 and the smoothed-image creating unit 34.

The HDD 102 stores therein an input image that is received, a plurality of level-value-limit smoothed images created by the level-value-limit smoothed-image creating process 104a, the level-value-limit combined image that is combined by the level-value-limit combining process 104b, and a smoothed image created by the smoothed-image creating process 104c.

The above-described programs 103a to 103c are not necessarily stored in the ROM 103. For example, they can be stored in a "portable physical medium" such as a flexible disk (FD), a CD-ROM, magneto-optic (MO) disk, a DVD disk, an IC card, and the like that can be inserted into the computer system 100; a "fixed physical medium" such as a hard disk drive (HDD) that can be arranged inside/outside the computer system 100; and "another computer system" connected to the computer system 100 via a public circuit, the Internet, a LAN, a WAN, and the like. The computer system 100 then reads and executes the programs from the above.

According to an embodiment of the present invention, it is possible to easily control the noise removal level at high speed. For example, it is possible to perform, in accordance with image components other than image components that are themselves to be processed, an edge preserving smoothing process at high speed, to combine an input image and a level-value-limit combined image independently of a discrete low-pass filter, and also to strengthen the noise removal level of a low luminance portion and to weaken the noise removal level of a high luminance area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   a level-value-limit smoothed-image creating unit that creates a plurality of first smoothed images corresponding to a target region of a first image including a plurality of pixels from first image information created from the first image, by applying low-pass filters to which different level value ranges are set respectively, to the target region and calculating an average value of level values which are of a plurality of pixels included in the target region and are for each of the level value ranges;
   a level-value combining unit that selects a part out of the first smoothed images based on a level value of a target pixel included in the target region and combines the selected part on level values corresponding to the target pixel to create a level value combined image; and
   a smoothed-image creating unit that smoothed image by combining the first image and the level-value combined image using a combining ratio determined on a basis of second image information which is created from the first image and different from the first image information.

2. The image processing apparatus according to claim 1, wherein each of the first image information and the second image information is a component created from the first image.

3. The image processing apparatus according to claim 1, wherein, the first image information is chrominance component information in the first image and the second image information is luminance component information in the first image.

4. The image processing apparatus according to claim 3, wherein, the combining ratio is determined in such a manner that a ratio of the first image is larger than that of the level-value combined image, if the luminance component information is larger than the chrominance component information.

5. The image processing apparatus according to claim 1, wherein the first image is an image that has been subjected to a grayscale correction process in which grayscale of an image is corrected, and the combining ratio is determined on the basis of grayscale correction information that indicates information on the grayscale correction process obtained from the first image.

6. The image processing apparatus according to claim 1, wherein the first image is an image that has been subjected to an edge enhancement process in which an edge portion of the image has been corrected, and the combining ratio is determined on the basis of edge enhancement information that indicates information on the edge enhancement process obtained from the first image.

7. An image processing method comprising:
creating a plurality of first smoothed images corresponding to a target region of a first image including a plurality of pixels from first image information created from the first image, by applying low-pass filters to which different level value ranges are set respectively, to the target region and calculating an average value of level values which are of a plurality of pixels included in the target region and are for each of the level value ranges;
selecting a part out of the first smoothed images based on a level value of a target pixel included in the target region and combines the selected part on level values corresponding to the target pixel to create a level value combined image; and
creating a second smoothed image by combining the first image and the level-value combined image using a combining ratio determined on a basis of second image information which is created from the first image and different from the first image information.

8. The image processing method according to claim 7, wherein each of the first image information and the second image information is a component created from the first image.

9. The image processing method according to claim 7, wherein, the first image information is chrominance component information in the first image and the second image information is luminance component information in the first image.

10. The image processing method according to claim 9, wherein, the combining ratio is determined in such a manner that a ratio of the first image is larger than that of the level-value combined image, if the luminance component information is larger than the chrominance component information.

11. The image processing method according to claim 7, wherein the first image is an image that has been subjected to a grayscale correction process in which grayscale of an image is corrected, and the combining ratio is determined on the basis of grayscale correction information that indicates information on the grayscale correction process obtained from the first image.

12. The image processing method according to claim 7, wherein the first image is an image that has been subjected to an edge enhancement process in which an edge portion of the image has been corrected, and the combining ratio is determined on the basis of edge enhancement information that indicates information on the edge enhancement process obtained from the first image.

13. A non-transitory computer readable storage medium having stored therein an image processing program, the image processing program causing a computer to execute a process comprising:
creating a plurality of first smoothed images corresponding to a target region of a first image including a plurality of pixels from first image information created from the first image, by applying low-pass filters to which different level value ranges are set respectively, to the target region and calculating an average value of level values which are of a plurality of pixels included in the target region and are for each of the level value ranges;
selecting a part out of the first smoothed images based on a level value of a target pixel included in the target region and combining the selected dart on level values corresponding to the target pixel in to create a level value combined image; and
creating a second smoothed image by combining the first image and the level-value combined image using a combining ratio determined on a basis of second image information which is created from the first image and different from the first image information.

14. The non-transitory computer readable storage medium according to claim 13, wherein each of the first image information and the second image information is a component created from the first image.

15. The non-transitory computer readable storage medium according to claim 13, wherein, the first image information is chrominance component information in the first image and the second image information is luminance component information in the first image.

16. The non-transitory computer readable storage medium according to claim 15, wherein, the combining ratio is determined in such a manner that a ratio of the first image is larger than that of the level-value combined image, if the luminance component information is larger than the chrominance component information.

17. The non-transitory computer readable storage medium according to claim 13, wherein the first image is an image that has been subjected to a grayscale correction process in which grayscale of an image is corrected, and the combining ratio is determined on the basis of grayscale correction information that indicates information on the grayscale correction process obtained from the first image.

18. The non-transitory computer readable storage medium according to claim 13, wherein the first image is an image that has been subjected to an edge enhancement process in which an edge portion of the image has been corrected, and the combining ratio is determined on the basis of edge enhancement information that indicates information on the edge enhancement process obtained from the first image.

* * * * *